United States Patent
Li et al.

(10) Patent No.: US 11,155,177 B2
(45) Date of Patent: Oct. 26, 2021

(54) CHARGING STATION MONITORING SYSTEM

(71) Applicant: Volvo Car Corporation, Gothenburg (SE)

(72) Inventors: Wei Li, Shanghai (CN); Huapeng Lu, Shanghai (CN); Xuming Yao, Shanghai (CN); Youjia Zhou, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 105 days.

(21) Appl. No.: 16/597,872

(22) Filed: Oct. 10, 2019

(65) Prior Publication Data

US 2020/0156493 A1    May 21, 2020

(30) Foreign Application Priority Data

Nov. 20, 2018  (CN) .......................... 201811380607.1

(51) Int. Cl.
| | |
|---|---|
| *B60L 53/60* | (2019.01) |
| *H02J 7/00* | (2006.01) |
| *H01M 10/44* | (2006.01) |
| *B60L 53/30* | (2019.01) |
| *B60L 53/68* | (2019.01) |

(52) U.S. Cl.
CPC ............... *B60L 53/60* (2019.02); *B60L 53/30* (2019.02); *H01M 10/44* (2013.01); *H02J 7/007* (2013.01); *H02J 7/0027* (2013.01); *H02J 7/007192* (2020.01); *B60L 53/68* (2019.02)

(58) Field of Classification Search
CPC .... H02J 7/007; H02J 7/007192; H02J 7/0027; B60L 53/60; H01M 10/44

USPC ................................ 320/104, 107, 108, 109
See application file for complete search history.

(56) References Cited

U.S. PATENT DOCUMENTS

| | | | |
|---|---|---|---|
| 10,021,354 B2 | 7/2018 | Haas | |
| 2010/0280678 A1 | 11/2010 | Tate et al. | |
| 2012/0233077 A1 | 9/2012 | Tate et al. | |
| 2014/0344026 A1 | 11/2014 | Outwater et al. | |
| 2015/0202975 A1* | 7/2015 | Solomon ............ | H02J 13/0003 |
| | | | 705/7.26 |

(Continued)

FOREIGN PATENT DOCUMENTS

CN           207022039 U       2/2018

OTHER PUBLICATIONS

Sep. 16, 2020 Extended European search report issued on international application No. 19205165.

(Continued)

*Primary Examiner* — Edward Tso
*Assistant Examiner* — Aaron Piggush
(74) *Attorney, Agent, or Firm* — Clements Bernard Walker; Christopher L. Bernard

(57) ABSTRACT

A charging station monitoring system comprising: a sensing device, a digital camera and a communication device which are arranged at a charging apparatus of a charging station, the sensing device and the digital camera each having a sensing range covering a parking lot associated with the charging apparatus and an area around the parking lot; and a controller configured to determine an occupation state of the parking lot and/or detect and record an action of a third party or foreign object based on sensed information from the sensing device and the digital camera.

12 Claims, 3 Drawing Sheets

(56) References Cited

U.S. PATENT DOCUMENTS

| | | | | |
|---|---|---|---|---|
| 2015/0356498 A1* | 12/2015 | Casanova | ............. | G07B 15/02 |
| | | | | 705/13 |
| 2017/0237944 A1* | 8/2017 | Haas | .................... | B60L 53/665 |
| | | | | 348/143 |
| 2017/0337448 A1 | 11/2017 | Ng et al. | | |
| 2018/0316229 A1* | 11/2018 | Anwer | ................ | H04B 5/0081 |

OTHER PUBLICATIONS

Apr. 7, 2020 Partial European Search Report issued on International Application 19205165.

* cited by examiner

CHARGING STATION MONITORING SYSTEM

CROSS-REFERENCE TO RELATED APPLICATION

The present disclosure claims the benefit of priority of co-pending Chinese Patent Application No. 201811380607.1, filed on Nov. 20, 2018, and entitled "Charging Station Monitoring System," the contents of which are incorporated in full by reference herein.

TECHNICAL FIELD

The disclosure relates to a charging station monitoring system which is able to actively monitor the state of the charging station.

BACKGROUND ART

Electric vehicles, including pure electric vehicles, hybrid power vehicles, etc., are also called new energy vehicles. An electric vehicle uses a vehicle carried battery as a power source to energize an electric motor to drive the vehicle to run. With respect to traditional fuel vehicles, electric vehicles have good application prospects since they have less damaging effects on environment. The vehicle carried battery needs to be charged after its energy is consumed to a certain extent. In order to enable the rapid adoption of electric vehicles, various charging stations have been established. The charging stations are generally set at public parking lots, large shopping centers, road side areas that allow parking, highway service centers, residential areas, etc. A charging station generally comprises charging apparatuses and parking lots containing charging apparatus. In many charging stations there are no service personnel, and vehicle charging can be achieved by drivers with self-service.

Unfortunately, it has been found that some non-charging vehicles, for example, fuel vehicles like gasoline vehicles and diesel vehicles, sometimes occupy the parking lots designated for electric vehicles with the associated charging apparatuses. For example, it was reported that in an area that about ⅔ of its parking lots associated with the charging apparatuses are occupied by non-charging vehicles at a certain time. When the parking lots associated with the charging apparatuses are occupied by non-charging vehicles, electric vehicles are blocked from charging.

In addition, the vehicle carried battery of an electric vehicle needs a long time to charge, so the driver generally leaves the vehicle after the charging has started. It has been found that some people may engage in undesirable behavior and actions to the vehicle under charging when the driver is absent. For example, a third party may take the charging apparatus off the vehicle so the vehicle was not properly charged. There are also some people who may take adverse actions to certain electric vehicles being charged.

It is therefore desired to actively monitor the charging station to find undesired occupation of the parking lots associated with the charging apparatuses, undesirable actions to the vehicles under charging, etc.

SUMMARY OF THE DISCLOSURE

An object of the disclosure is to provide a charging station monitoring system which is able to monitor the state of the charging station and send the monitored content and information to the user, which can be the owner of the charging station, or the owner or driver of the electric vehicle.

For achieving this objective, the disclosure in one aspect provides a charging station monitoring system which comprises: a sensing device, a digital camera and a communication device which are arranged at a charging apparatus of a charging station, the sensing device and the digital camera each having a sensing range covering a parking lot associated with the charging apparatus and an area around the parking lot; and a controller configured to determine an occupation state of the parking lot and/or detect and record an action of a third party or a foreign object based on sensed information from the sensing device and the digital camera.

According to a possible embodiment of the disclosure, the communication device is configured to be able to communicate with a cloud server which is associated with an intelligent portable device of a user.

According to a possible embodiment of the disclosure, the controller is configured to activate the digital camera based on the sensed information of the sensing device or based on a request from the user's intelligent portable device as received via the cloud server, and is able to send images and video captured by the digital camera to the cloud server via the communication device.

According to a possible embodiment of the disclosure, the controller activates the digital camera based on information of the sensing device, and the controller determines whether a vehicle entering or occupying the parking lot is a non-electric vehicle or whether the action of the third party or foreign object is undesirable based on the images captured by the digital camera.

According to a possible embodiment of the disclosure, the controller determines that the vehicle in the parking lot is a non-electric vehicle or the action of the third party or foreign object is undesirable, the controller sends corresponding information, images and/or video to the cloud server so that the cloud server is able to send the received information, images and/or video to the user's intelligent portable device.

According to a possible embodiment of the disclosure, the charging station monitoring system further comprises a warning device arranged at the charging apparatus for emitting corresponding warning signal or communications regarding a non-electric vehicle entering the parking lot or an undesirable action happening here.

According to a possible embodiment of the disclosure, the controller determines that the vehicle in the parking lot is an electric vehicle, the controller "wakes up" or turns on the charging apparatus to prepare to charge the vehicle; and after the charging apparatus starts to charge the vehicle, the controller sends the occupation state of the charging apparatus to the cloud server.

According to a possible embodiment of the disclosure, the controller is configured to activate the digital camera when it receives a request for checking realtime images or video of the charging apparatus and/or the parking lot from the user's intelligent portable device via the cloud server, and then sends the realtime images or video captured by the digital camera to the cloud server so that the cloud server is able to send the realtime images or video to the user's intelligent portable device.

According to a possible embodiment of the disclosure, the charging station monitoring system further comprises the cloud server which is in communication with the communication device on one hand and in communication with the user's intelligent portable device on the other hand.

According to a possible embodiment of the disclosure, the cloud server is configured to record images and video that are captured by the digital camera and received via the communication device.

According to a possible embodiment of the disclosure, the cloud server is configured to send the recorded images and/or video captured by the digital camera to the user's intelligent portable device in the condition that it receives a request for checking the historical records of the charging apparatus and/or the parking lot from the user's intelligent portable device.

According to a possible embodiment of the disclosure, the cloud server is further in communication with an online map cloud server so that it can send the occupation state of the charging apparatus to the online map cloud server.

According to a possible embodiment of the disclosure, the sensing device comprises a radar.

According to the disclosure, a charging station monitoring system is established which reliably monitors the state of the charging station by using a sensing device and a digital camera and sends the monitored contents to the owner of the charging station or the vehicle under charging, so deliberate occupation of the parking lot associated with the charging apparatus and improper or unauthorized actions to the vehicle under charging can be monitored.

DETAILED DESCRIPTION OF PREFERRED EMBODIMENTS

Now some embodiments of the disclosure will be described with reference to the drawings.

Figure 1:
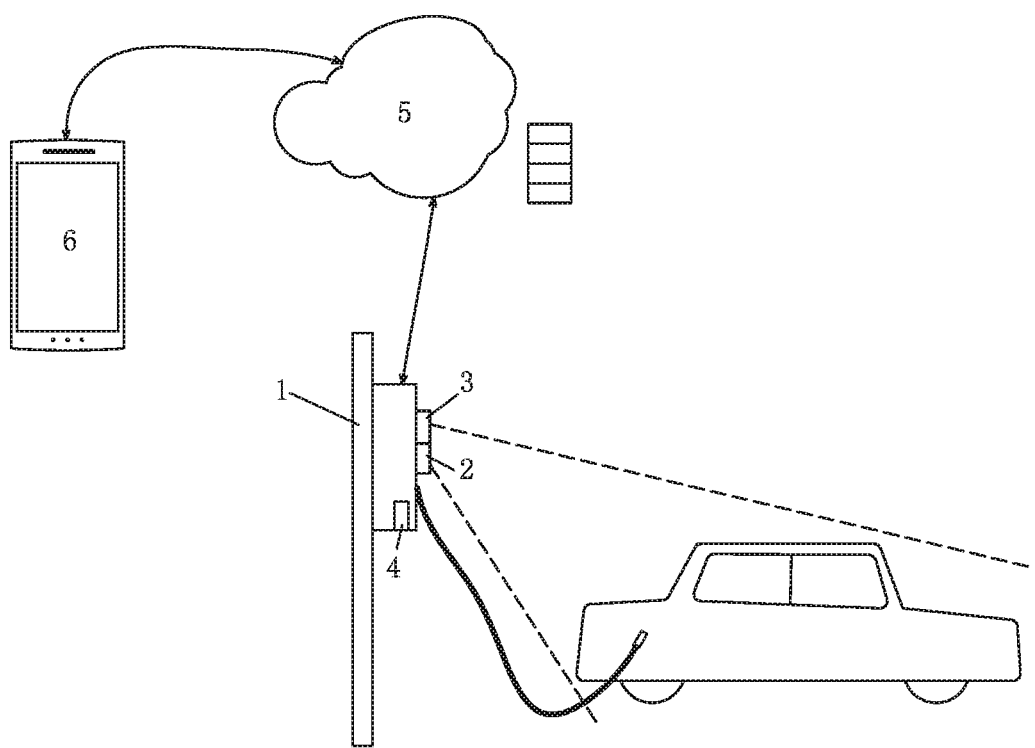
FIG. 1 is a schematic layout of a charging station monitoring system according to the disclosure.

As shown in FIG. 1, the disclosure generally relates to a charging station monitoring system which comprises a sensing device 2 and a digital camera 3 which are provided in association with a charging apparatus 1 (for example, charging box, charging pile, etc.) of a charging station. The sensing device 2 and the camera 3 each have a sensing area that covers a parking lot associated with the charging apparatus 1 and an area around the parking lot of the charging apparatus.

The sensing device 2 may comprise one or more of a radar, a underground pressure sensor, a near field monitoring device, an infrared sensor, a proximal sensor, etc. A preferred embodiment of the sensing device 2 is a radar considering that radar is more sensitive to a moving object.

When necessary, the charging station monitoring system may further comprise a warning device 4, such as audio and/or video warning device, associated with the charging apparatus 1 in the charging station.

The sensing device 2 and the camera 3 may be integrated in the charging apparatus 1, and the warning device 4 may also be integrated in the charging apparatus 1.

The charging station monitoring system further comprises a cloud server 5 which is able to wirelessly communicate with the charging station or the charging apparatus 1 and an intelligent portable device 6 (such as a smartphone) of a user (the owner of the charging station and/or the owner or driver of an electric vehicle). For this end, a communication device (not shown) is provided in the charging station or the charging apparatus 1. The communication device may be a wireless-type communication device which can communicate with the cloud server 5 directly in a wireless manner; alternatively, the communication device may be a wire-type communication device which can communicate with a back end service station that is able to wirelessly communicate with the cloud server 5.

The sensing device 2, the camera 3, the communication device and the optional warning device 4 provided in or at the charging apparatus 1 are connected with a controller (not shown) provided in, at, or at back end of the charging apparatus 1.

The user's intelligent portable device 6 is mounted with a corresponding application program ("APP"). The intelligent portable device 6 can be connected to the charging station monitoring system through boning with a corresponding service account, scanning a QR code, or the like.

Through the cloud server 5, communication is established between the charging station or the charging apparatus 1 and the user's intelligent portable device 6, so that various data, including information, notification, video stream, command, etc., can be transferred between the charging station or the charging apparatus 1 and the intelligent portable device 6. The cloud server 5 can also record various historical data.

The sensing device 2 is used for sensing the occupation state of the parking lot of the charging apparatus, and the controller determines whether the parking lot associated with the charging apparatus is empty or be occupied by a vehicle based on the sensed information of the sensing device 2.

The camera 3 is used to capture images of a vehicle which occupies the parking lot of the charging apparatus, and the controller determines the type of the vehicle which occupies the parking lot associated with the charging apparatus based on the images captured by the camera 3. For example, by scanning and identifying the license plate of the vehicle, it can determine whether the vehicle is an electric vehicle or not. In general, the license plates of electric vehicles are different from that of fuel vehicles. Thus, the type of a vehicle can be determined by identifying its license plate (identification). In addition, the manufacturer and model of a vehicle can be determined using the images of the vehicle, and the type of the vehicle can be checked against a database.

If the controller determines that the vehicle is a non-electric vehicle, it sends corresponding information to the user's intelligent portable device 6 via the cloud server 5. The warning device 4 (if there is one) can emit corresponding warnings to urge the non-electric vehicle to turn away. In another embodiment, if an electric vehicle runs into the parking lot but no charging action has happened after a long time, corresponding information may be sent to the user's intelligent portable device 6 via the cloud server 5.

The camera 3 is also used to capture images of a human, animal or object that is in or near the parking lot of the charging apparatus, and the controller can thus identify improper or unauthorized actions, such as destroying the infrastructure, damaging the vehicle, and undesired behaviors (including but not limited to removing the charging device), etc. Once the controller finds an improper or unauthorized action, it can send corresponding information to the user's intelligent portable device 6 via the cloud server 5. The warning device 4 (if there is one) may emit corresponding warning.

Figure 2:
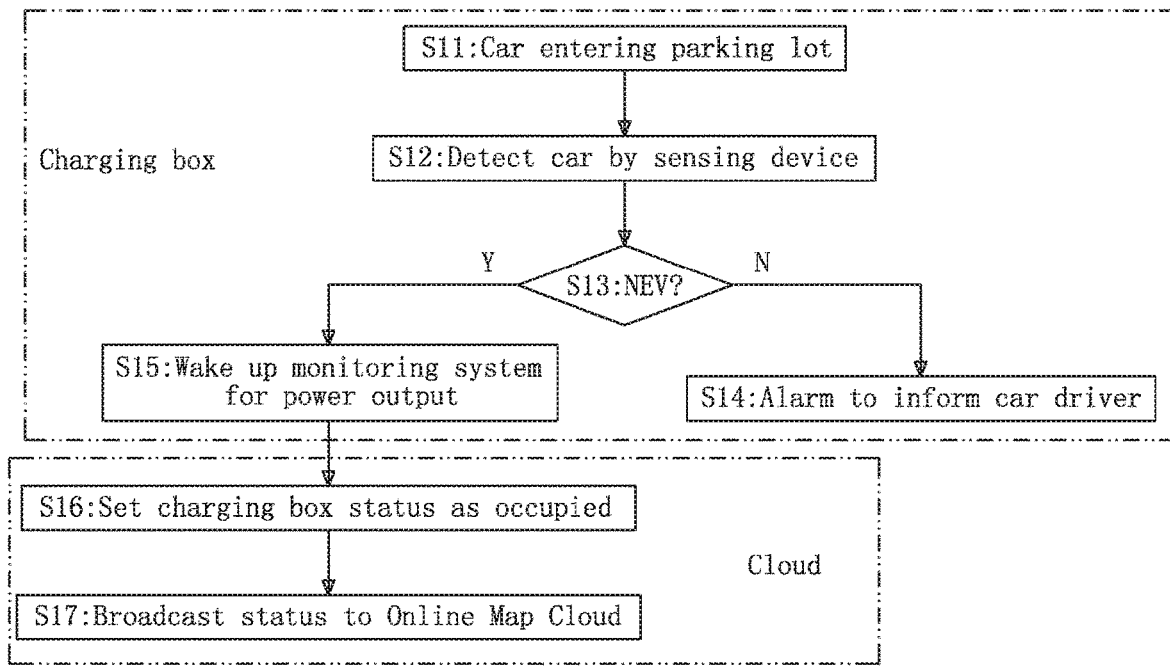
FIG. 2 is a flow chart of an operation of the charging station monitoring system to actively monitor a vehicle entering a charging station.

A program of the disclosure for actively monitoring a vehicle entering the charging station based on the images captured by the camera 3 is illustrated in FIG. 2. First, in Step S11, there is a vehicle entering the parking lot associated with the charging apparatus 1.

Then, in Step S12, the sensing device 2 associated with the charging apparatus 1 sensed the entering or presence of the vehicle. It is noted that, thanks to the relatively high sensitivity of sensing device to the moving of an object, the sensing device 2 can sense the vehicle entering the parking lot associated with the charging apparatus precisely and reliably.

Then, in Step S13, the controller judges whether the entered vehicle is an electric vehicle. If the controller result is "No", the program goes to Step S14; and if the controller result is "Yes", the program goes to Step S15.

In Step S14, the controller instructs the warning device 4 (if there is one) to emit corresponding warning to indicate that it is not proper for the entered vehicle to be parked in this parking lot. Another possible embodiment of the invention is that the controller sends the occupation state of the parking lot to the cloud server 5 which then sends corresponding information to the intelligent portable device 6 of the charging station owner.

In Step S15, the controller wakes up (turns on) the charging apparatus 1 for preparation for charging and then charging the entered vehicle. Then the program goes to Step S16. It should be noted that the charging apparatus 1 may be normally deactivated, and is activated when it is woke up by the controller and then goes into a ready for charging state. In this way, energy can be saved.

In Step S16, at the side of the cloud server 5, the occupation state of the charging apparatus 1 is set to be occupied.

Then, in Step S17, the cloud server 5 sends the occupation state of the charging apparatus 1 to an online map cloud server. Based on the information provided by the online map cloud server, other vehicles can obtain the occupation state of this charging apparatus, so a vehicle, which was planned to come to this charging apparatus to charge its battery, can go to other charging apparatus.

Figure 3:
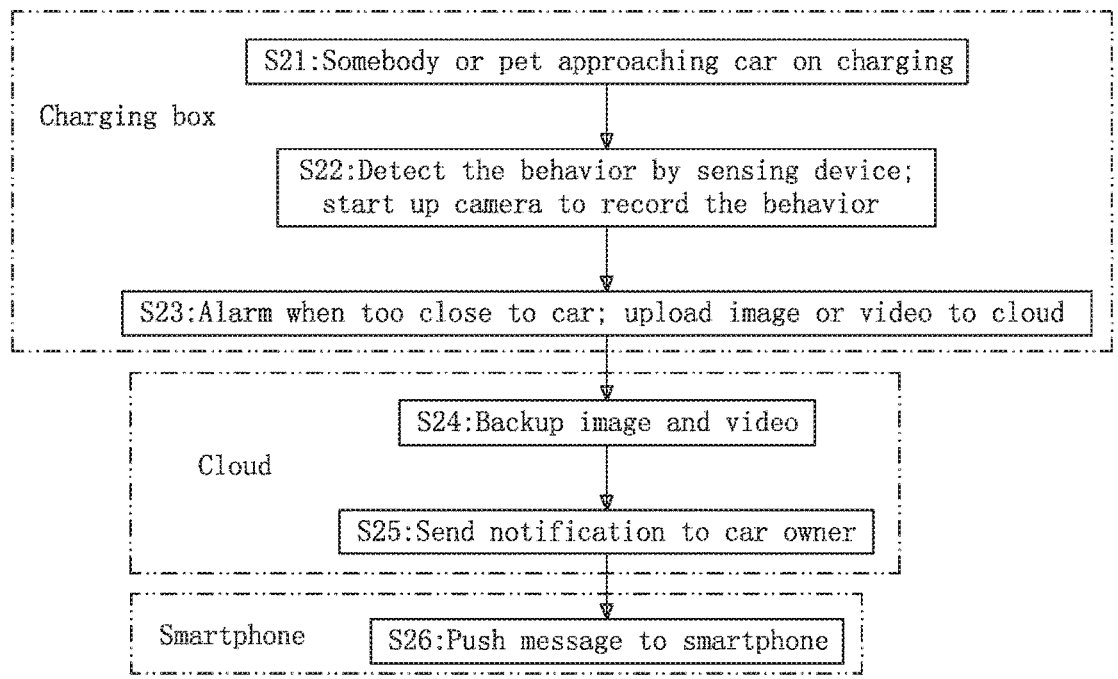
FIG. 3 is a flow chart of an operation of the charging station monitoring system to actively monitor a person or an animal approaching the charging station.

A program of the disclosure for actively monitoring a human, animal or other object approaching the charging station based on the images captured by the camera 3 is illustrated in FIG. 3. First, in Step S21, a human, animal or other object is approaching the electric vehicle which is parked in the parking lot associated with the charging apparatus 1 and is being charged with the charging apparatus 1.

Then, in Step S22, the sensing device 2 associated with the charging apparatus 1 senses the action of the human, animal or other object approaching the vehicle under charging, and the controller activates the camera 3 to record this action.

Then, in Step S23, when the controller judges that the human, animal or other object is too close to the vehicle under charging, it instructs the warning device 4 (if there is) to emit corresponding warning. In another embodiment of the invention, the controller sends information (in image and/or video) about the action of the human, animal or other object approaching the vehicle to the cloud server 5.

Then, in Step S24, at the side of the cloud server 5, the received images and/or videos are backed up.

Then, in Step S25, the cloud server 5 sends corresponding information or notification to the intelligent portable device 6 of the owner of the charging station and/or the driver (or owner) of the electric vehicle.

Then, in Step S26, the intelligent portable device 6 receives the information or notification from the cloud server 5 and creates an indication message (for example, via ring or vibration).

It is noted that the camera 3 may be normally closed, and is activated when the controller determines that there is a vehicle entering a parking lot associated with the charging apparatus or a human, animal or other object becomes too close to the vehicle under charging. In this way, energy can be saved. The camera 3 may be activated together with the charging apparatus 1 to monitor the charging procedure of the vehicle.

The operations of the charging station monitoring system as described above with reference to FIGS. 2 and 3 are triggered at the side of the charging station. On the other hand, the disclosure also provides embodiments in which operations, for example, those shown in FIGS. 4 and 5, of the charging station monitoring system are triggered by the intelligent portable device 6.

Figure 4:
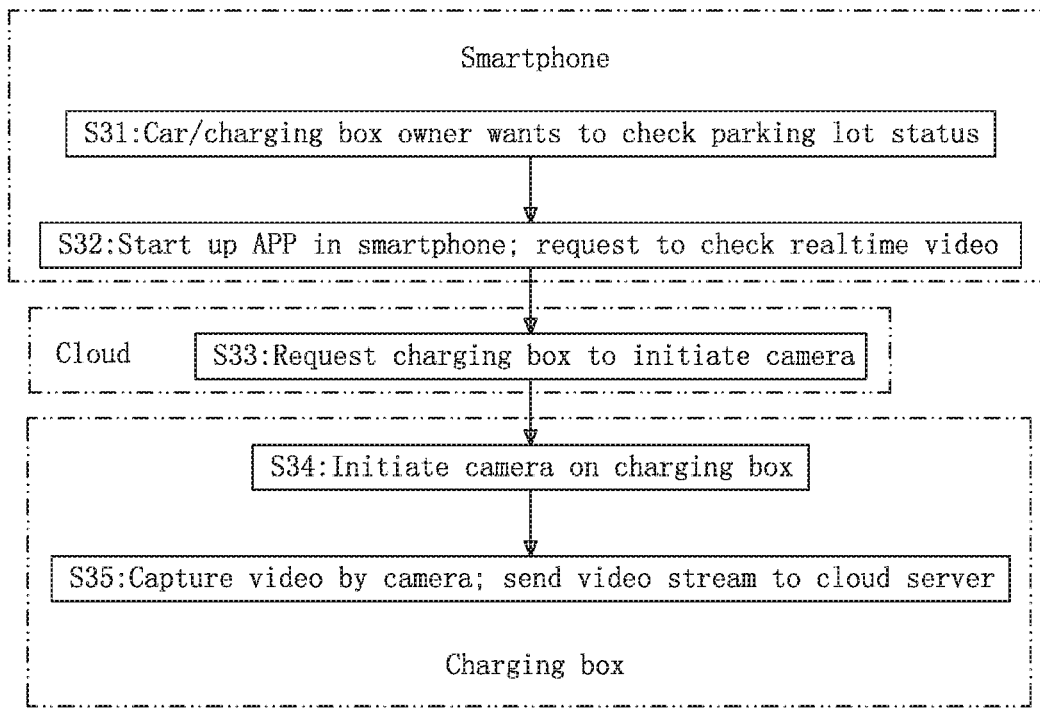
FIG. 4 is a flow chart of an operation of the charging station monitoring system to check the state of the charging station based on a request from a user.

In FIG. 4, first, in Step S31, the owner of the charging station or the driver (or owner) of the electric vehicle wants to check the realtime state of the parking lot associated with the charging apparatus 1. For example, when the driver wants to go to the charging apparatus 1 to charge the vehicle, he may check the state of the charging apparatus 1 to avoid making a futile trip.

Then, in Step S32, the owner of the charging station or the driver (or owner) of the electric vehicle initiates the corresponding application program in the intelligent portable device 6, and sends a request for checking the realtime video of the parking lot associated with the charging apparatus 1.

Then, at the side of the cloud server 5, in Step S33, it sends a request for activating the camera 3 associated with the charging apparatus 1.

Then, at the side of the charging station, in Step S34, the camera 3 associated with the charging apparatus 1 is activated.

Then, in Step S35, the camera 3 captures realtime video of the parking lot of the charging apparatus, the controller at the charging apparatus 1 sends realtime images and/or video to the cloud server 5 via the communication device, and the cloud server 5 can send the received realtime images and/or video to the intelligent portable device 6.

It is noted that, since the camera 3 is closed in a normal state and is activated under the request from the intelligent portable device 6, energy can be saved.

Figure 5:
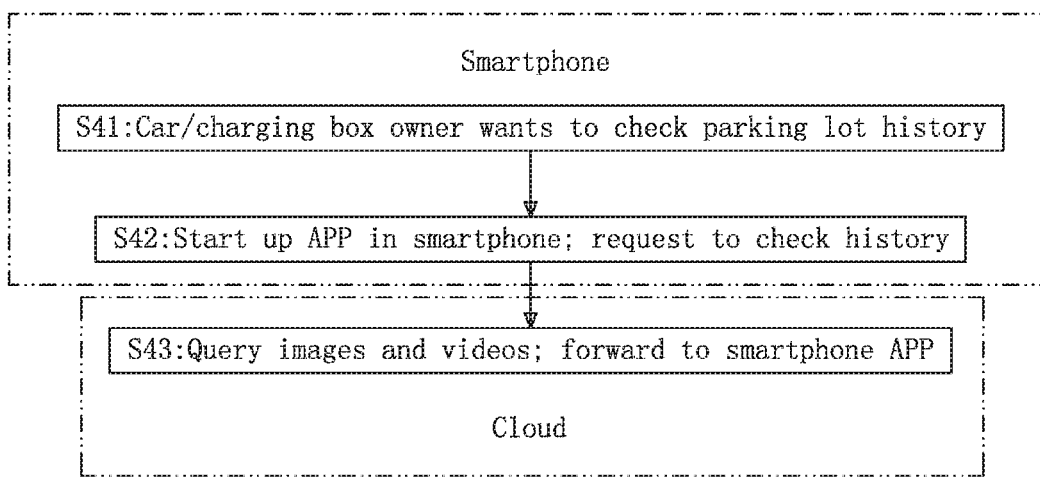
FIG. 5 is a flow chart of an operation of the charging station monitoring system to check the historical records of the charging station based on a request from a user.

In FIG. 5, first, in Step S41, the owner of the charging station or the driver (or owner) of the electric vehicle wants to check the historical records of the parking lot associated with the charging apparatus 1.

Then, in Step S42, the owner of the charging station or the driver (or owner) of the electric vehicle initiates the corresponding application program in the intelligent portable device 6, and sends a request for checking the historical records of the parking lot associated with the charging apparatus 1.

Then, at the side of the cloud server 5, in Step S43, it queries the historical records (in image or video) of the parking lot associated with the charging apparatus 1, and sends the historical records to the intelligent portable device 6.

Of course, a skilled in the art can make adaptive modifications to the components and functions of the charging station monitoring system of the disclosure according to real requirements.

According to the disclosure, this invention enables a user to actively monitor a vehicle that enters a parking lot associated with the charging apparatus or a third party or foreign object that approaches a vehicle under charging based on the functionalities equipped at the charging apparatus, and to obtain realtime or historical records of the charging station upon user's request. Thus, usage efficiency of the charging station is guaranteed, and meaningless waste of time can be avoided. In addition, undesirable actions can be effectively prevented in the charging station.

While certain embodiments have been described, these embodiments have been presented by way of example only, and are not intended to limit the scope of the disclosure. The attached claims and their equivalents are intended to cover all the modifications, substitutions and changes as would fall within the scope and spirit of the disclosure.

The invention claimed is:

1. A charging station monitoring system comprising:
a radar, a digital camera and a communication device which are arranged at a charging apparatus of a charging station, the radar and the digital camera each having a sensing range covering a parking lot associated with the charging apparatus and an area around the parking lot, the communication device being configured to communicate with a cloud server which is associated with an intelligent portable device of a user, the digital camera being normally closed, and the charging apparatus being normally deactivated; and
a controller configured to activate the digital camera based on sensed information from the radar, and, when the radar senses there is a vehicle entering the parking lot, to determine whether the vehicle is an electric vehicle or not, to wake up the charging apparatus for preparation for charging if the controller determines that the vehicle is an electric vehicle, and to send the occupation state of the charging apparatus to the cloud server after the charging apparatus starts to charge the vehicle;
wherein, when the controller determines that the vehicle entering the parking lot is a non-electric vehicle, the controller sends corresponding information of the vehicle to the cloud server, and the cloud server then sends the received information to the user's intelligent portable device.

2. The charging station monitoring system of claim 1, wherein the controller is further configured to detect and record an action of a third party or a foreign object based on sensed information from the radar and the digital camera.

3. The charging station monitoring system of claim 1, wherein the controller is further configured to determine whether a vehicle in the parking lot is a non-electric vehicle or whether the action of a third party or a foreign object is undesirable based on the images captured by the digital camera.

4. The charging station monitoring system of claim 1, wherein the controller is further configured to activate the digital camera based on a request from the user's intelligent portable device as received via the cloud server, and to send images and video captured by the digital camera to the cloud server via the communication device.

5. The charging station monitoring system of claim 3, wherein when the controller determines that the vehicle entering the parking lot is a non-electric vehicle or the action of the third party or foreign object is undesirable, the controller sends corresponding information, images or video to the cloud server, and the cloud server sends the received information, images or video to the user's intelligent portable device.

6. The charging station monitoring system of claim 5, further comprising a warning device arranged at the charging apparatus to issue corresponding warning signal or communications regarding a non-electric vehicle entering the parking lot.

7. The charging station monitoring system of claim 1, wherein the controller is further configured to send the occupation state of the charging apparatus to the cloud server after the charging apparatus starts to charge the vehicle.

8. The charging station monitoring system of claim 1, wherein the controller is further configured to activate the digital camera when it receives a request to check realtime images or video of the charging apparatus or the parking lot from the user's intelligent portable device via the cloud server, and to send the realtime images or video captured by the digital camera to the cloud server, and the cloud server sends the realtime images or video to the user's intelligent portable device.

9. The charging station monitoring system of claim 1, further comprising the cloud server which is in communication with the communication device on one hand and in communication with the user's intelligent portable device on the other hand.

10. The charging station monitoring system of claim 9, wherein the cloud server is configured to record images and video that are captured by the digital camera and received via the communication device.

11. The charging station monitoring system of claim 9, wherein the cloud server is configured to send the recorded images or video captured by the digital camera to the user's intelligent portable device in the condition that it receives a request to check the historical records of the charging apparatus or the parking lot from the user's intelligent portable device.

12. The charging station monitoring system of claim 9, wherein the cloud server is further in communication with an online map cloud server, and the cloud server sends the occupation state of the charging apparatus to the online map cloud server.

* * * * *